US008244169B1

(12) United States Patent  (10) Patent No.: US 8,244,169 B1
DiMartino et al.  (45) Date of Patent: *Aug. 14, 2012

(54) SYSTEM AND METHOD FOR ACTIVE JAMMING OF CONFIDENTIAL INFORMATION TRANSMITTED AT A POINT-OF-SALE READER

(75) Inventors: Allison A. DiMartino, Overland Park, KS (US); Ryan P. Dreiling, Overland Park, KS (US); Elizabeth C. Roche, Prairie Village, KS (US); Kevin K. Zhu, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/207,645

(22) Filed: Aug. 11, 2011

Related U.S. Application Data

(63) Continuation of application No. 12/022,903, filed on Jan. 30, 2008, now Pat. No. 8,055,184.

(51) Int. Cl.
*H04K 3/00* (2006.01)
(52) U.S. Cl. ........... 455/1; 455/410; 455/411; 455/41.2; 455/558; 235/380; 235/382; 705/44
(58) Field of Classification Search ................ 455/41.1, 455/41.2, 410, 411, 414.1, 406, 66.1, 557, 455/558; 235/379–383, 492, 375, 451, 487; 705/40, 77, 34, 17, 43, 44
See application file for complete search history.

(56) References Cited

U.S. PATENT DOCUMENTS

| | | |
|---|---|---|
| 5,453,601 A | 9/1995 | Rosen |
| 5,496,966 A | 3/1996 | Hightower et al. |
| 6,122,625 A | 9/2000 | Rosen |
| 6,446,049 B1 | 9/2002 | Janning et al. |
| 6,584,326 B1 | 7/2003 | Boydston et al. |
| 6,679,423 B2 | 1/2004 | Ijichi et al. |
| 6,879,965 B2 | 4/2005 | Fung et al. |
| 6,880,085 B1 | 4/2005 | Balczewski et al. |
| 7,146,159 B1 | 12/2006 | Zhu |
| 7,233,785 B2 | 6/2007 | Yamagishi et al. |
| 7,269,256 B2 | 9/2007 | Rosen |
| 7,413,113 B1 | 8/2008 | Zhu |
| 7,434,723 B1 | 10/2008 | White et al. |
| 7,475,044 B1 | 1/2009 | Kawai et al. |
| 7,494,067 B1 | 2/2009 | Zhu |
| 7,546,956 B2 | 6/2009 | Adams et al. |
| 7,644,039 B1 | 1/2010 | Magee et al. |
| 7,644,859 B1 | 1/2010 | Zhu |
| 7,707,113 B1 | 4/2010 | DiMartino et al. |
| 7,748,636 B2 | 7/2010 | Finn |
| 7,819,307 B2 | 10/2010 | Lyons et al. |
| 7,822,688 B2 | 10/2010 | Labrou et al. |

(Continued)

OTHER PUBLICATIONS

DiMartino, Allison, Patent Application "Method and System for Setting Levels of Electronic Wallet Security," Filing Date—Feb. 8, 2010, U.S. Appl. No. 12/702,270.

(Continued)

*Primary Examiner* — Sujatha Sharma

(57) ABSTRACT

A system for impeding reception of confidential information is disclosed. The system comprises a point-of-sale transceiver configured to receive confidential information transmitted by a mobile device incorporating an electronic wallet and a signal generator in communication with the point-of-sale transceiver and configured to broadcast a jamming signal substantially concurrently with the point-of-sale transceiver receiving the confidential information.

21 Claims, 4 Drawing Sheets

U.S. PATENT DOCUMENTS

| | | | |
|---|---|---|---|
| 7,926,714 B1 | 4/2011 | Zhu | |
| 8,055,184 B1 | 11/2011 | DiMartino et al. | |
| 8,060,449 B1 | 11/2011 | Zhu | |
| 8,107,953 B2 | 1/2012 | Zimmerman et al. | |
| 8,123,128 B1 | 2/2012 | Zhu | |
| 8,126,806 B1 | 2/2012 | DiMartino et al. | |
| 8,165,961 B1 | 4/2012 | DiMartino et al. | |
| 2001/0005184 A1 | 6/2001 | Tsuno et al. | |
| 2002/0006806 A1 | 1/2002 | Kinnunen et al. | |
| 2002/0011519 A1 | 1/2002 | Shults, III | |
| 2002/0052754 A1 | 5/2002 | Joyce et al. | |
| 2002/0062284 A1 | 5/2002 | Kawan | |
| 2002/0123971 A1 | 9/2002 | Maritzen et al. | |
| 2002/0147913 A1 | 10/2002 | Lun Yip | |
| 2003/0009382 A1 | 1/2003 | D'Arbeloff et al. | |
| 2003/0028481 A1 | 2/2003 | Flitcroft et al. | |
| 2003/0032409 A1 | 2/2003 | Hutcheson et al. | |
| 2003/0045328 A1 | 3/2003 | Natsuno | |
| 2003/0070080 A1 | 4/2003 | Rosen | |
| 2003/0083933 A1 | 5/2003 | McAlear | |
| 2003/0149900 A1 | 8/2003 | Glassman et al. | |
| 2003/0211862 A1 | 11/2003 | Hutchison, IV et al. | |
| 2004/0093265 A1 | 5/2004 | Ramchandani et al. | |
| 2004/0122771 A1* | 6/2004 | Celi et al. | 705/43 |
| 2004/0166839 A1 | 8/2004 | Okkonen et al. | |
| 2004/0192303 A1 | 9/2004 | Puthenkulam | |
| 2004/0203601 A1 | 10/2004 | Morriss et al. | |
| 2005/0216424 A1 | 9/2005 | Gandre et al. | |
| 2005/0234778 A1 | 10/2005 | Sperduti et al. | |
| 2006/0073808 A1 | 4/2006 | Buchert | |
| 2006/0085847 A1 | 4/2006 | Ikeuchi et al. | |
| 2006/0136334 A1 | 6/2006 | Atkinson et al. | |
| 2006/0165060 A1 | 7/2006 | Dua | |
| 2006/0167823 A1 | 7/2006 | York et al. | |
| 2006/0191995 A1 | 8/2006 | Stewart et al. | |
| 2006/0211408 A1 | 9/2006 | Yamagishi et al. | |
| 2007/0010213 A1 | 1/2007 | Dewan | |
| 2007/0011461 A1 | 1/2007 | Jeng | |
| 2007/0080215 A1* | 4/2007 | Ramachandran et al. | 235/381 |
| 2007/0095892 A1 | 5/2007 | Lyons et al. | |
| 2007/0125840 A1 | 6/2007 | Law et al. | |
| 2007/0145152 A1 | 6/2007 | Jogand-Coulomb et al. | |
| 2007/0198410 A1 | 8/2007 | Labgold et al. | |
| 2007/0223685 A1 | 9/2007 | Boubion et al. | |
| 2007/0233615 A1 | 10/2007 | Tumminaro | |
| 2007/0234427 A1 | 10/2007 | Gardner et al. | |
| 2007/0244811 A1 | 10/2007 | Tumminaro | |
| 2007/0248232 A1 | 10/2007 | Driscoll et al. | |
| 2007/0255620 A1 | 11/2007 | Tumminaro | |
| 2007/0255652 A1 | 11/2007 | Tumminaro | |
| 2007/0281664 A1 | 12/2007 | Kaneko et al. | |
| 2007/0291995 A1 | 12/2007 | Rivera | |
| 2008/0059379 A1 | 3/2008 | Ramaci et al. | |
| 2008/0067240 A1 | 3/2008 | Nakano et al. | |
| 2008/0126260 A1 | 5/2008 | Cox et al. | |
| 2008/0201212 A1 | 8/2008 | Hammad et al. | |
| 2008/0238610 A1 | 10/2008 | Rosenberg | |
| 2008/0297306 A1 | 12/2008 | Huajun et al. | |
| 2008/0315989 A1* | 12/2008 | Mirkazemi-Moud et al. | 340/5.66 |
| 2009/0018964 A1 | 1/2009 | Liu et al. | |
| 2009/0046858 A1 | 2/2009 | Iyer et al. | |
| 2009/0050689 A1 | 2/2009 | Sako et al. | |
| 2009/0078761 A1 | 3/2009 | Sines | |
| 2009/0097531 A1* | 4/2009 | Franceschini et al. | 375/133 |
| 2009/0253409 A1 | 10/2009 | Slavov et al. | |
| 2009/0270174 A1 | 10/2009 | Kelly et al. | |
| 2009/0313689 A1 | 12/2009 | Nyström et al. | |
| 2010/0030651 A1 | 2/2010 | Matotek et al. | |
| 2010/0094752 A1 | 4/2010 | Heath | |
| 2010/0133337 A1 | 6/2010 | Van Rensburg | |
| 2011/0006112 A1 | 1/2011 | Mueller | |
| 2011/0053560 A1 | 3/2011 | Jain et al. | |

OTHER PUBLICATIONS

Zhu, Kevin, Patent Application entitled, "Partially Delegated Over-the-Air Provisioning of a Secure Element," filed Oct. 10, 2011, U.S. Appl. No. 13/270,205.

Notice of Allowance dated Oct. 17, 2011, U.S. Appl. No. 11/949,759, filed Dec. 3, 2007.

Advisory Action dated Oct. 21, 2011, U.S. Appl. No. 11/863,229, filed Sep. 27, 2007.

Pre-Interview Communication dated Nov. 9, 2011, U.S. Appl. No. 12/702,270, filed Feb. 8, 2010.

Supplemental Notice of Allowance dated Sep. 28, 2011, U.S. Appl. No. 12/022,903.

Supplemental Notice of Allowance dated Oct. 6, 2011, U.S. Appl. No. 12/348,371.

Final Office Action dated Oct. 14, 2011, U.S. Appl. No. 12/371,901.

DiMartino, Allison, "Method for Launching an Electronic Wallet," Filing Date—Dec. 3, 2007, U.S. Appl. No. 11/949,759.

DiMartino, Allison, "Method and System for Blocking Confidential Information at a Point-Of-Sale Reader from Eavesdropping," Filing Date—Sep. 27, 2007, U.S. Appl. No. 11/863,229.

DiMartino, Allison A., et al., Patent Application entitled, "System and Method for Active Jamming of Confidential Information Transmitted at a Point-of-Sale Reader," filed Jan. 30, 2008, U.S. Appl. No. 12/022,903.

Katzer, Robin D., et al., Patent Application entitled, "Control of Secure Elements through Point-of-Sale Device," filed Apr. 8, 2008, U.S. Appl. No. 12/099,771.

Zhu, Kevin, Patent Application entitled, "Mobil Device Password System," filed Jan. 5, 2009, U.S. Appl. No. 12/348,377.

Zhu, Kevin, Patent Application entitled, "Partially Delegated Over-the-Air Provisioning of a Secure Element," filed Jan. 5, 2009, U.S. Appl. No. 12/348,371.

Persson, Sarah A.V., et al., Patent Application entitled, "Electronic Wallet Removal from Mobile Electronic Devices," filed Feb. 16, 2009, U.S. Appl. No. 12/371,901.

BlackBerry Enterprise Server for Microsoft Exchange, Version 4.0—Handheld Management Guide, Last Modified Aug. 18, 2006, Research in Motion Limited, Canada.

BlackBerry Enterprise Server for Microsoft Exchange, Version 4.0—Administration Guide, Last Modified Nov. 10, 2006, Research in Motion Limited, Canada.

Derfler, Frank J., et al., "How Networks Work," Sep. 2000, Que Corporation, A Division of MacMillan Computer Publishing, USA.

Office Action dated Jun. 17, 2009, U.S. Appl. No. 11/949,759, filed Dec. 3, 2007.

Office Action dated Nov. 13, 2009, U.S. Appl. No. 11/949,759, filed Dec. 3, 2007.

Office Action dated May 25, 2010, U.S. Appl. No. 11/949,759, filed Dec. 3, 2007.

Final Office Action dated Sep. 10, 2010, U.S. Appl. No. 11/949,759, filed Dec. 3, 2007.

Office Action dated Feb. 15, 2011, U.S. Appl. No. 11/949,759, filed Dec. 3, 2007.

Final Office Action dated Aug. 5, 2011, U.S. Appl. No. 11/949,759, filed Dec. 3, 2007.

Office Action dated Feb. 17, 2009, U.S. Appl. No. 11/863,229, filed Sep. 27, 2007.

Office Action dated Sep. 14, 2009, U.S. Appl. No. 11/863,229, filed Sep. 27, 2007.

Office Action dated Dec. 24, 2009, U.S. Appl. No. 11/863,229, filed Sep. 27, 2007.

Final Office Action dated Jun. 22, 2010, U.S. Appl. No. 11/863,229, filed Sep. 27, 2007.

Office Action dated Mar. 16, 2011, U.S. Appl. No. 11/863,229, filed Sep. 27, 2007.

Office Action dated Mar. 6, 2009, U.S. Appl. No. 11/863,632, filed Sep. 28 2007.

Office Action dated May 6, 2009, U.S. Appl. No. 11/863,632.

Notice of Allowance dated Dec. 1, 2009, U.S. Appl. No. 11/863,632.

Office Action dated Mar. 11, 2011, U.S. Appl. No. 12/022,903.

Notice of Allowance dated Jun. 21, 2011, U.S. Appl. No. 12/022,903.

Office Action dated Mar. 1, 2011, U.S. Appl. No. 12/099,771.

Office Action dated Aug. 3, 2011, U.S. Appl. No. 12/099,771.
Office Action dated Jan. 13, 2011, U.S. Appl. No. 12/348,377.
Final Office Action dated Jun. 20, 2011, U.S. Appl. No. 12/348,377.
Office Action—Restriction dated Mar. 16, 2011, U.S. Appl. No. 12/348,371.
Office Action dated May 24, 2011, U.S. Appl. No. 12/348,371.
Office Action—Restriction dated Mar. 14, 2011, U.S. Appl. No. 12/371,901.
Office Action dated Apr. 14, 2011, U.S. Appl. No. 12/371,901.
Final Office Action dated Aug. 22, 2011, U.S. Appl. No. 11/863,229, filed Sep. 27, 2007.
Supplemental Notice of Allowance dated Sep. 13, 2011, U.S. Appl. No. 12/022,903.
Advisory Action dated Aug. 30, 2011, U.S. Appl. No. 12/348,377.
Notice of Allowance dated Sep. 9, 2011, U.S. Appl. No. 12/348,371.
Anonymous, "Sourcebook '96," Progressive Grocer Sourcebook '96 Supplement, Dec. 1995, pp. Cover-48, Maclean-Hunter Media Inc.
DiMartino, Allison, "Method for Launching an Electronic Wallet," Filing Date—Jan. 4, 2012, U.S. Appl. No. 13/343,708.
Notice of Allowance dated Dec. 14, 2011, U.S. Appl. No. 12/702,270, filed Feb. 8, 2010.
Final Office Action dated Jan. 4, 2012, U.S. Appl. No. 12/099,771.
Notice of Allowance dated Jan. 5, 2012, U.S. Appl. No. 121348,377.
FAIPP Pre-Interview Communication dated Feb. 21, 2012, U.S. Appl. No. 13/270,205.
Advisory Action dated Feb. 9, 2012, U.S. Appl. No. 12/371,901.
Notice of Allowance dated Apr. 9, 2012, U.S. Appl. No. 13/270,205.
Baker, D., "Real-Time Provisioning of SIM cards: A Boon to GSM Operators", Apr. 13, 2011. http://www.billingworld.com/blogs/baker/2011/04/real-time-provisioning-of-sim-cards-a-boon-to-gsm.aspx.
Notice of Allowance dated Apr. 9, 2012, U.S. Appl. No. 11/863,229 filed on Sep. 27, 2007.

\* cited by examiner

SYSTEM AND METHOD FOR ACTIVE JAMMING OF CONFIDENTIAL INFORMATION TRANSMITTED AT A POINT-OF-SALE READER

CROSS-REFERENCE TO RELATED APPLICATIONS

This application is a continuation of and claims priority to U.S. patent application Ser. No. 12/022,903, entitled "System and Method for Active Jamming of Confidential Information Transmitted at a Point-of-Sale Reader", filed on Jan. 30, 2008, which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A point-of-sale (POS) terminal or station may receive payment information associated with a purchase and seek authorization for payment from a back-end financial system, for example a credit card authorization service. The point-of-sale terminal may receive the financial information from a contactless card. A contactless card communicates with a point-of-sale terminal or other device at least in part without physically contacting the point-of-sale terminal, for example through radio frequency communication conducted in the proximity of the point-of-sale terminal. This radio frequency communication may include near field communication (NFC) technology.

Various payment cards, retail loyalty cards, and product coupons may be employed in different payment and or purchase scenarios. For example, in paying for groceries at a point-of-sale terminal, a customer may present a loyalty card issued by the grocery store chain, one or more product coupons, and either a credit card or a debit card. In another payment scenario, a commuter may present a transit card to obtain access to a mass transit vehicle.

SUMMARY

Systems for impeding reception of confidential information are disclosed. In an embodiment, the system comprises a point-of-sale transceiver configured to receive confidential information transmitted by a mobile device incorporating an electronic wallet. The system also comprises a signal generator in communication with the point-of-sale transceiver and configured to broadcast a jamming signal substantially concurrently with the point-of-sale transceiver receiving the confidential information.

In another embodiment, a method of impeding reception of confidential information is disclosed. The method comprises producing a jamming signal, broadcasting the jamming signal from a point-of-sale device, and receiving confidential information at the point-of-sale device. The jamming signal is broadcast substantially concurrently with receiving the confidential information, and the confidential information is received from a portable electronic device containing an electronic wallet.

In another embodiment, a method of jamming reception of confidential information is disclosed. The method comprises exchanging handshaking signals between a portable electronic device and a point-of-sale transceiver and the portable electronic device transmitting a preamble sequence during a first time interval, wherein the portable electronic device contains an electronic wallet. The method also comprises the point-of-sale transceiver transmitting a cancelling preamble sequence during the first time interval, wherein the cancelling preamble sequence is operable to substantially attenuate the preamble sequence. The method also comprises the portable electronic device transmitting confidential information during a second time interval, wherein the second time interval follows the first time interval in time.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
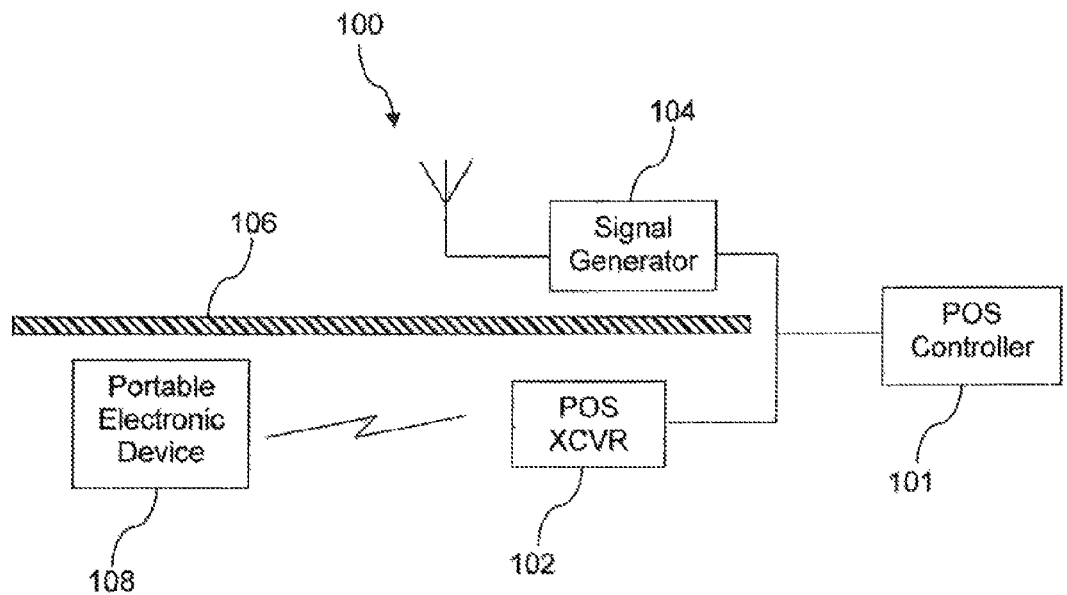
FIG. 1 is a block diagram of a system for jamming confidential information according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

When paying for goods and services with an electronic wallet at a point-of-sale (POS) terminal, confidential information may be transmitted from the electronic wallet to the point-of-sale terminal via contactless communication, for example using radio frequency transmissions and/or near field communication (NFC) and/or radio frequency identify (RFID) technologies. It may be desirable to prevent the theft of this confidential information, for example, by another who employs electronic interception equipment to capture the unintended emissions or radiations of the confidential information. A system and methods of jamming the reception of this confidential information at unauthorized receivers are disclosed.

Several generated jamming signals are contemplated by this disclosure. One generated signal is based on transmitting additive white Gaussian noise (AWGN) at a power level effective to reduce the signal-to-noise ratio (SNR) of the signal containing the confidential information to a level that the unauthorized receiver is unable to demodulate the confidential information. Another generated signal is based on transmitting a spoofing signal that conforms to the communication format for providing the confidential information to the point-of-sale terminal that contains information unassociated with the confidential information. The spoofing signal is transmitted at an effective power level to impede or prevent the unauthorized receiver from demodulating the confidential information. Another generated signal is based on transmitting a preamble cancelling signal to inhibit an unauthorized receiver from synchronizing and/or tracking the preamble signal and thereby inhibit the unauthorized receiver receiving the confidential information. In some contexts, the jamming signal may be referred to as a blocking signal and a jammer may be referred to as a blocker.

A variety of techniques to avoid the jamming signal impeding the exchange of the confidential information with the point-of-sale terminal are contemplated. Radio shielding material, hereinafter referred to as shielding, may be interposed between the point-of-sale transceiver and a signal generator, whereby the jamming signals transmitted by the signal generator in the direction of the point-of-sale transceiver may be attenuated. The signal generator may transmit the jamming signals with a directional radiation pattern and orient a null of the radiation pattern, a direction of substantially lowered radiation strength, towards the point-of-sale transceiver. The signal generator may provide a baseband jamming signal to the point-of-sale transceiver which the point-of-sale transceiver may employ to cancel the jamming signal, thereby to receive the confidential information unimpeded by the jamming signal.

Turning now to FIG. 1, a system 100 for jamming confidential information at a point-of-sale terminal is discussed. The system 100 comprises a point-of-sale controller 101, a point-of-sale transceiver 102, a signal generator 104, and optional shielding 106 interposed between the signal generator 104 and the point-of-sale transceiver 102. In some contexts the signal generator 104 may be referred to as a jammer or as a jammer transmitter. While not formally a part of the system 100, a portable electronic device 108 is illustrated for purposes of promoting a full understanding of the operation of the system 100.

When a purchase is completed at a point-of-sale terminal, a confidential information, for example, a credit card account number and optionally an authorization number, may be provided by the portable electronic device 108 to the point-of-sale terminal. The portable electronic device 108 may be a mobile phone, a personal digital assistant (PDA), a palm top computer, or other such electronic device. The portable electronic device 108 may include an electronic wallet application which provides financial functions such as credit cards, debit cards, transit cards, gift cards, loyalty cards, and other such payment functions. To complete a payment at the point-of-sale terminal, the portable electronic device 108 may exchange handshaking signals with the point-of-sale transceiver 102 and then transmit the confidential information to the point-of-sale transceiver 102.

The communication link between the portable electronic device 108 and the point-of-sale transceiver 102 may be provided by radio frequency (RF) communication and/or near field communication (NFC) and/or radio frequency identity (RFID) communication. In some embodiments, the radio transmission of the confidential information by the portable electronic device 108 may propagate beyond the point-of-sale terminal and be vulnerable to interception and capture by an identify thief, for example, using an electronic device with a directional antenna aimed to maximize reception of the confidential information transmission.

The point-of-sale controller 101 may be coupled to a cash register and/or bar code reader (not shown) to compose a point-of-sale terminal. The point-of-sale controller 101 mediates among and provides controlling functionality to the several components of the point-of-sale terminal. The point-of-sale controller 101 is coupled to the signal generator 104 and the point-of-sale transceiver 102 and provides control and coordination functions. In an embodiment, the point-of-sale controller 101 is implemented as a general purpose computer system. General purpose computer systems are discussed in more detail hereinafter.

In an embodiment, the signal generator 104 is coupled to the point-of-sale controller 101 and the point-of-sale transceiver 102. The signal generator 104 transmits a jamming or blocking signal to inhibit the ability of identity thieves to intercept and capture the transmission of the confidential information, for example, a credit card account number and optional authorization data. Several different types of jamming signals are contemplated. These different types of jamming signals may be used individually or, in some embodiments, more than one type of jamming signal may be transmitted at the same time by the signal generator 104. The signal generator 104 may transmit the blocking or jamming signal continuously while the point-of-sale terminal is powered on and ready for service. In another embodiment, the signal generator 104 may remain in a ready non-transmitting state until a trigger signal from the point-of-sale transceiver 102 and/or the POS controller 101 causes the signal generator 104 to begin transmitting the jamming signal. The signal generator 104 may transmit the jamming signal until a second trigger signal from the point-of-sale transceiver 102 and/or the POS controller 101 causes the signal generator 104 to return to the ready non-transmitting state. A visual indication may be provided to indicate when the signal generator 104 is actively transmitting. The visual indication may be useful to identify a possible failure of the signal generator 104 and to promote user confidence in the security of their financial information.

As is well known to those skilled in the communications art, receiving a signal typically requires that a minimum signal-to-noise ratio (SNR) be maintained. If the signal-to-noise ratio of the signal drops below the minimum level, the signal may not be decoded without errors. While different modulation techniques promote successful communications at different signal-to-noise ratios, each modulation technique generally can be associated with a minimum signal-to-noise ratio to promote reliable communications based on the modulation technique. Some approaches of the present disclosure are based on transmitting blocking or jamming signals that cause the signal-to-noise ratio of the signal containing the confidential information to drop below the level generally needed for error free reception at possible locations of an identity thief, for example, at least about 3 meters away from the point-of-sale terminal.

In one embodiment, additive white Gaussian noise (AWGN) is transmitted by the signal generator 104 at an effective transmission power level to inhibit or defeat the ability to demodulate or receive the transmission of the confidential information. In combination with this disclosure, one skilled in the art may readily determine the effective transmission power level. In some cases, a minimum signal-to-noise ratio to demodulate or receive a transmission based on known modulation techniques may be calculated theoretically. Alternatively, environmental testing may be performed to verify and/or determine the effective transmission power level. Other types of noise signals are also contemplated by the present disclosure for use as blocking or jamming signals.

In another embodiment, a spoofing signal is transmitted by the signal generator 104 at an effective transmission power level to dominate the transmission of confidential information. Expressed in another way, the spoofing signal is transmitted with enough power that an attempt to receive the transmitted confidential information may demodulate the spoofing signal as the desired signal and exclude the transmitted confidential information as noise. The spoofing signal is similar in structure to the signal transmitted by the portable electronic device 108.

For example, in an embodiment the signal transmitted by the portable electronic device 108 may include a preamble portion, and a series of packets. The packets may comprise a header and a payload portion. In this exemplary case, the spoofing signal would include appropriate preamble information and header information but the payload portion would contain information unassociated with the confidential information. When an identity thief attempts to intercept and capture the confidential information transmitted by the portable electronic device 108 to the point-of-sale transceiver 102, the identity thief will instead intercept and capture the information unassociated with the confidential information. In an embodiment, the information unassociated with the confidential information may be deliberately invalid to avoid inadvertently revealing an operable credit card account number and/or authorization number. While an exemplary communication format is described above comprising a preamble followed by one or more packets, where each packet comprises a header portion and a data portion, the present disclosure also contemplates other communication formats, all of which may be spoofed to inhibit identity theft according to the present disclosure.

In an embodiment, the signal generator 104 may transmit a cancelling signal. In some communication formats, a preamble or training sequence comprising a known signal may be transmitted by either the point-of-sale transceiver 102 or the portable electronic device 108. The known signal may be used to synchronize communications and adjust operational parameters. The signal generator 104 may transmit a signal that effectively cancels the preamble sequence, thereby inhibiting the ability of an identity thief to receive the later transmitted confidential information. Additionally, the signal generator 104 may transmit a cancelling signal to cancel portions of an initial handshaking communication session, for example, the portion to be transmitted by the point-of-sale transceiver 102. In this case, the point-of-sale transceiver 102 may send the information to be transmitted by the point-of-sale transceiver 102 during the handshaking session to the signal generator 104, whereby the signal generator 104 may produce a signal cancelling the corresponding handshaking transmission, thereby inhibiting the ability of an identity thief to receive the later transmitted confidential information.

In some embodiments, the optional shielding 106 is located between the signal generator 104 and the point-of-sale transceiver 102 to attenuate the blocking or jamming signal that is incident upon the point-of-sale transceiver 102 and/or on the portable electronic device 108, in order to avoid inhibiting the reception of the confidential information at the point-of-sale transceiver 102. In another embodiment, the signal generator 104 may be configured with a directional antenna to create a null in the radiation pattern in the direction of the point-of-sale transceiver 102 and or the portable electronic device 108, in order to avoid inhibiting the reception of the confidential information by the point-of-sale transceiver 102. In another embodiment, the signal generator 104 sends a form of the blocking or jamming signal or signals to the point-of-sale transceiver 102, and the point-of-sale transceiver 102 is able to use this signal or signals to cancel the known blocking or jamming signal or signals broadcast by the signal generator 104 and to receive the confidential information. For example, in an embodiment, the signal generator 104 may send the jamming signal over a coaxial cable to the point-of-sale transceiver 102, up-convert the jamming signal, and broadcast the jamming signal. The point-of-sale transceiver 102 may down convert the received signal which includes both the signal transmitted by the portable electronic device 108 and the up-converted jamming signal broadcast by the signal generator 104, equalize the power level of the jamming signal received from the signal generator 104 over the coaxial cable, and subtract the jamming signal from the down converted received signal, thereby substantially attenuating the jamming signal.

Figure 2:
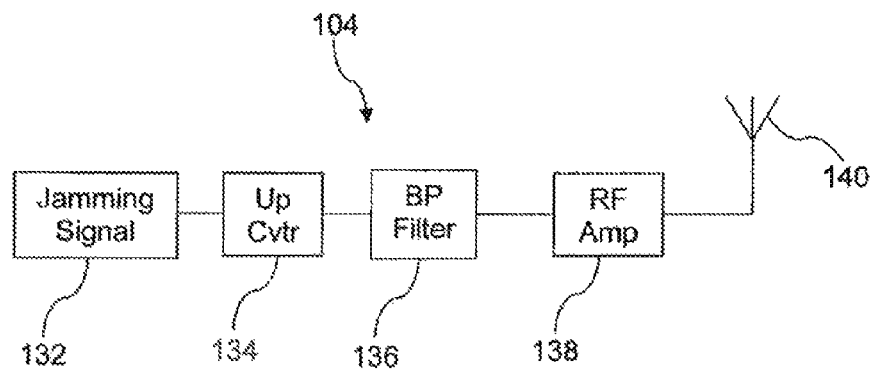
FIG. 2 is a block diagram of a signal generator according to an embodiment of the disclosure.

Turning now to FIG. 2, a block diagram of a signal generator 104 is described. The signal generator 104 comprises a jamming signal generator 132, an up-converter 134, a bandpass filter 136, a radio frequency (RF) amplifier 138, and an antenna 140. The jamming signal generator 132 synthesizes or generates the desired jamming signal. For example, the jamming signal may be additive white Gaussian noise, another known form of noise signal, a spoofing signal, and/or a cancellation signal as described above with reference to FIG. 1. The jamming signal may be a baseband signal. The jamming signal may combine multiple types of jamming signal. The jamming signal is shifted up to an appropriate radio frequency by the up-converter 134. In an embodiment, the jamming signal is shifted up to a frequency about the same as the frequency of the radio frequency range used by the communication link between the POS transceiver 102 and the portable electronic device 108. The up-converter may be implemented as a mixer or other well known up-converter device. The radio frequency signal may be bandpass filtered to select the desired bandwidth for transmission. The bandpass radio frequency signal is amplified to an effective level of power for transmitting by the radio frequency amplifier 138 and broadcast by the antenna 140. It will be readily appreciated that one skilled in the art may implement the signal generator 104 in several different ways, all of which are contemplated by the present disclosure. For example, in an embodiment a filter (not shown) may be located between the radio frequency amplifier 138 and the antenna 140 to attenuate out of band energy which may have been introduced by the radio frequency amplifier 138. In an embodiment, the antenna 140 is configured to radiate with a directional pattern, wherein the directional pattern is oriented to direct a null, or low radiation amplitude, towards the point-of-sale transceiver 102. The signal generator 104 may be located in a variety of positions. In an embodiment, the signal generator 104 may be integrated with the point-of-sale terminal. Alternatively, the signal generator 104 may be separate from the point-of-sale terminal, and one signal generator 104 may provide jamming signals for a plurality of point-of-sale terminals, for example, one signal generator 104 may provide jamming signals for each of an array of checkout stations in a grocery store, in a department store, or other retail outlet. In an embodiment, the signal generator 104 may be oriented based on the environment of the point-of-sale terminals and the directions of perceived risk for identity theft. For example, the signal generator 104 may employ an at least partially directional antenna 140 to concentrate the jamming signal radiated by the antenna 140 preferentially towards either the directions of perceived risk for identity theft and/or towards the point-of-sale terminals.

Figure 3A:
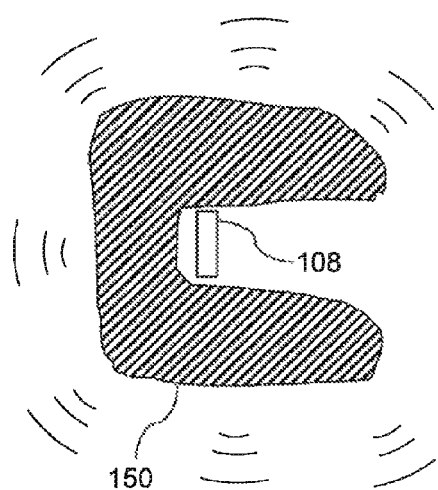
FIG. 3A illustrates a cross section view of a point-of-sale reader according to an embodiment of the disclosure.

Turning now to FIG. 3A, a point-of-sale reader 150 is illustrated in a cross section view. The point-of-sale reader 150 is illustrated as radiating a jamming or blocking signal. The central recess of the point-of-sale reader 150 is configured to receive the portable electronic device 108 for the purpose of completing a payment transaction by receiving the confidential information, for example, credit card account number and optional authorization number. In an embodiment, radio absorptive material (RAM) may be disposed within or on the surface of the enclosure of the point-of-sale reader 150 to attenuate reflections and diffractions of the radio transmission of confidential information from the portable electronic device 108 to the point-of-sale transceiver 102, thereby reducing the opportunity for an identity theft to intercept these reflections and diffractions of the confidential information. In an embodiment, the radio absorptive material may be adhered over an antenna portion of the point-of-sale transceiver 102, wherein the radio absorptive material does not absorb all incident radio energy emitted by the portable electronic device 108, a portion of the radio energy passes through the radio absorptive material to the antenna portion of the point-of-sale transceiver 102, and reflections and/or diffractions of the incident radio energy emitted by the portable electronic device 108 is absorbed when radiating away from the antenna portion of the point-of-sale transceiver 102.

Figure 3B:
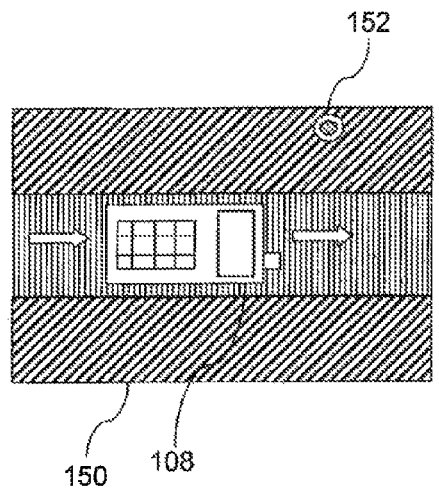
FIG. 3B illustrates a front view of the point-of-sale reader according to an embodiment of the disclosure.

Turning now to FIG. 3B, the point-of-sale reader 150 is illustrated in a front view. In an embodiment, the portable electronic device 108 may be swiped through the central recess of the point-of-sale reader 150 during the payment transaction. In an embodiment, a jamming indicator 152 is configured to illuminate when the signal generator 104 is transmitting the jamming signal.

Figure 4:
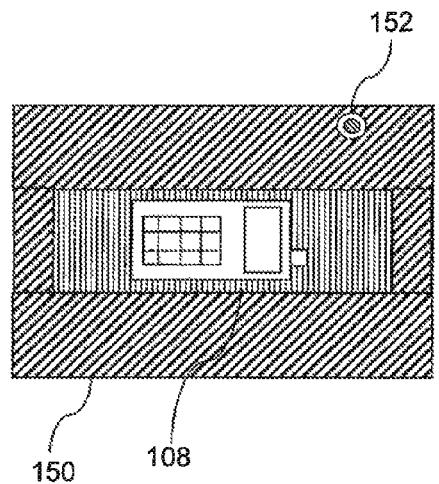
FIG. 4 illustrates a front view of the point-of-sale reader according to another embodiment of the disclosure.

Turning now to FIG. 4, the point-of-sale reader 150 is illustrated in a front view according to a different embodiment. In this embodiment, the ends of the central recess of the point-of-sale reader 150 are enclosed to discourage swiping the portable electronic device 108 through the central recess.

Figure 5:
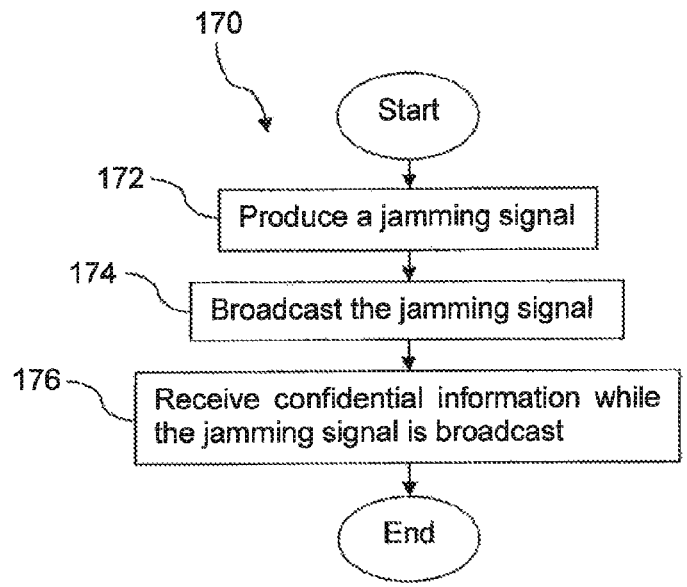
FIG. 5 is a diagram of a method according to an embodiment of the disclosure.

Turning now to FIG. 5, a method 170 is described. At block 172 a jamming signal is produced. As discussed above, various types of jamming or blocking signal are contemplated by the present disclosure including, but not limited to, additive white Gaussian noise (AWGN), another noise signal, a spoofing signal, or a combination of these. Producing the jamming signal may include up-converting a baseband jamming signal to an appropriate radio frequency center frequency, filtering the jamming signal, and amplifying the jamming signal. In an embodiment, the jamming signal is up-converted or up-shifted to a radio frequency range that about equals the radio frequency range used by the radio frequency communication link between the POS transceiver 102 and the portable electronic device 108.

At block 174, the jamming signal is broadcast. Broadcasting the jamming signal includes broadcasting the jamming signal from an antenna. In an embodiment, the jamming signal may be broadcast with a directional radiation pattern that directs a null or low amplitude portion of the radiation pattern towards the point-of-sale transceiver 102. In an embodiment, the jamming indicator 152 indicates when the jamming signal is being transmitted.

At block 176, the point-of-sale transceiver 102 receives confidential information, for example, a credit card account number and an optional authorization number, while the jamming signal is being broadcast. In an embodiment, the point-of-sale transceiver 102 has access to the jamming signal, either the baseband jamming signal or the radio frequency jamming signal, and uses the jamming signal to create a cancelling signal to avoid inhibition of the ability to receive the confidential information from the portable electronic device 108.

Figure 6:
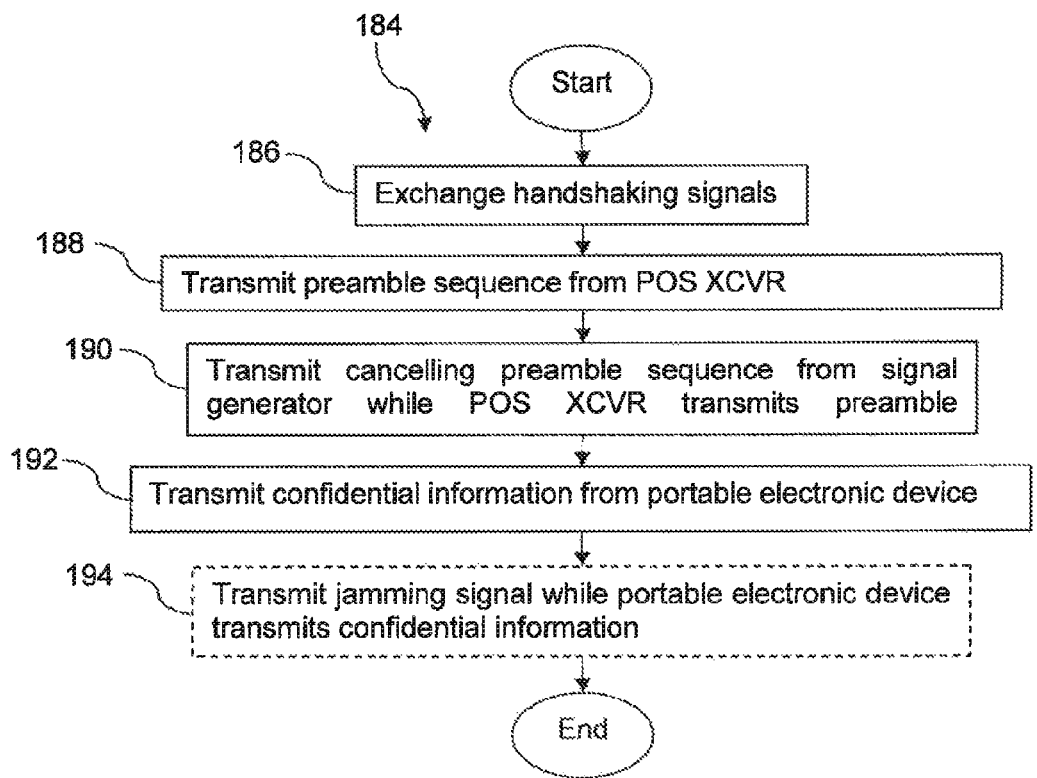
FIG. 6 is a diagram of another method according to an embodiment of the disclosure.

Turning now to FIG. 6, a method 184 is described. At block 186, handshaking signals are exchanged between the point-of-sale transceiver 102 and the portable electronic device 108. At block 188, a preamble sequence is transmitted, for example, during a first time interval. In an embodiment, the preamble sequence is transmitted by the point-of-sale transceiver 102. In another embodiment, however, the portable electronic device 108 may transmit the preamble sequence. The preamble sequence may promote synchronization between the point-of-sale transceiver 102 and the portable electronic device 108.

At block 190, a cancelling preamble sequence is transmitted. In an embodiment, the cancelling preamble sequence may be transmitted by the signal generator 104. The cancelling preamble sequence is determined to substantially cancel or attenuate the preamble sequence signal that is incident at a point greater than about three meters away from the point-of-sale transceiver 102. In an embodiment, the cancelling preamble sequence may be transmitted while the preamble sequence is transmitted, for example, during the first time interval.

At block 192, the confidential information is transmitted by the portable electronic device 108. In an embodiment, at block 194 the signal generator 104 transmits a jamming signal while the portable electronic device 108 transmits the confidential information. In an embodiment, the preamble sequence is transmitted before the confidential information, and receiving the confidential information may be based on first having received and decoded correctly the preamble sequence. Thus, an identity thief may be prevented from intercepting and capturing the confidential information by preventing the identity thief from receiving and decoding correctly the preamble sequence. For example, the preamble sequence and the preamble cancelling sequence may be transmitted during the first time interval, and the confidential information may be transmitted during a second time interval, wherein the second time interval follows the first time interval in time.

Figure 7:
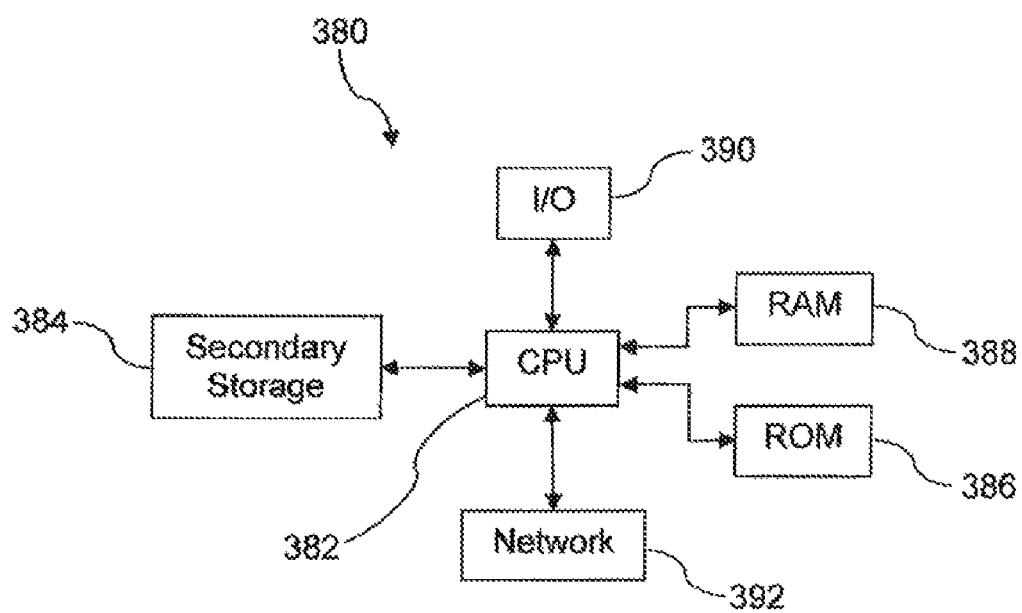
FIG. 7 illustrates an exemplary general purpose computer system suitable for implementing the several embodiments of the disclosure.

Portions of the system 100 described above, for example the POS controller 101, may be implemented on any general-purpose computer with sufficient processing power, memory resources, and network throughput capability to handle the necessary workload placed upon it. FIG. 7 illustrates a typical, general-purpose computer system 380 suitable for implementing portions of the system 100 disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382, for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example, optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for impeding reception of confidential information, comprising:
    a point-of-sale transceiver configured to receive a confidential information transmitted by a mobile device incorporating an electronic wallet; and
    a signal generator in communication with the point-of-sale transceiver and configured to broadcast a jamming signal substantially concurrent with the point-of-sale transceiver receiving the confidential information.

2. The system of claim 1, wherein the jamming signal is based on an additive white Gaussian noise signal.

3. The system of claim 1, wherein the confidential information is received according to a format that includes a payload portion containing the confidential information and wherein the jamming signal is broadcast according to the format with the payload portion of the jamming signal containing information unassociated with the confidential information.

4. The system of claim 1, wherein the point-of-sale transceiver communicates with the mobile device using one of a near field communication technology and a radio frequency identity technology.

5. The system of claim 1, wherein the point-of-sale transceiver is configured to transmit a transaction initialization signal to the mobile device and wherein the signal generator broadcasts the jamming signal at a higher power level than the power level used by the point-of-sale transceiver to transmit the transaction initialization signal.

6. The system of claim 1, further including radio shielding material located between the point-of-sale transceiver and the signal generator.

7. The system of claim 1, wherein the signal generator is further configured to send the jamming signal to the point-of-sale transceiver.

8. The system of claim 7, wherein the point-of-sale transceiver is further configured to cancel the broadcasted jamming signal using the jamming signal received from the signal generator to enable the point-of-sale transceiver to receive the confidential information.

9. A method of impeding reception of confidential information, comprising:
    producing a jamming signal;
    broadcasting the jamming signal from a point-of-sale device; and
    receiving a confidential information at the point-of-sale device, wherein the jamming signal is broadcast substantially concurrently with the reception of the confidential information and wherein the confidential information is received from a portable electronic device containing an electronic wallet.

10. The method of claim 9, wherein producing a jamming signal is based on an additive white Gaussian noise signal.

11. The method of claim 9, wherein producing a jamming signal is based on producing a first signal similar in structure to a second signal received by the point-of-sale device, wherein the second signal contains the confidential information, and wherein the first signal contains information unassociated with the confidential information.

12. The method of claim 11, wherein the first signal and second signal contain a payload portion and an overhead portion, wherein the payload portion of the second signal contains the confidential information, and wherein the payload portion of the first signal contains information unassociated with the confidential information contained in the payload portion of the second signal.

13. The method of claim 9, wherein producing the jamming signal comprises up-converting a baseband jamming signal to another radio frequency within a radio frequency range.

14. The method of claim 13, wherein the radio frequency range is within a radio frequency range used by a radio frequency communication link between the point-of-sale device and the portable electronic device.

15. A method of jamming reception of a confidential information, comprising:
   producing a jamming signal;
   receiving the jamming signal at a point-of-sale device;
   broadcasting the jamming signal;
   cancelling, by the point-of-sale device, the broadcasted jamming signal using the received jamming signal;
   receiving a confidential information at the point-of-sale device, wherein the jamming signal is broadcast substantially concurrently with the reception of the confidential information and wherein the confidential information is received from a portable electronic device containing an electronic wallet.

16. The method of claim 15, wherein the receiving the jamming signal at the point-of-sale device is over a coaxial cable.

17. The method of claim 15, wherein the jamming signal is a baseband signal.

18. The method of claim 15, wherein the broadcasted jamming signal is up-converted prior to the broadcasting.

19. The method of claim 18, wherein the cancelling the broadcasted jamming signal using the received jamming signal comprises:
   down converting the broadcasted up-converted jamming signal; and
   subtracting the received jamming signal from the down converted jamming signal.

20. The method of claim 19, wherein the cancelling the broadcasted jamming signal using the received signal further comprises equalizing a power level of the received jamming signal.

21. The method of claim 1, wherein the jamming signal is configured to be broadcast from an antenna.

* * * * *